July 17, 1923.
L. SLAMA
1,462,249
TIRE CHAIN TIGHTENER AND LOCK
Filed Feb. 2, 1922
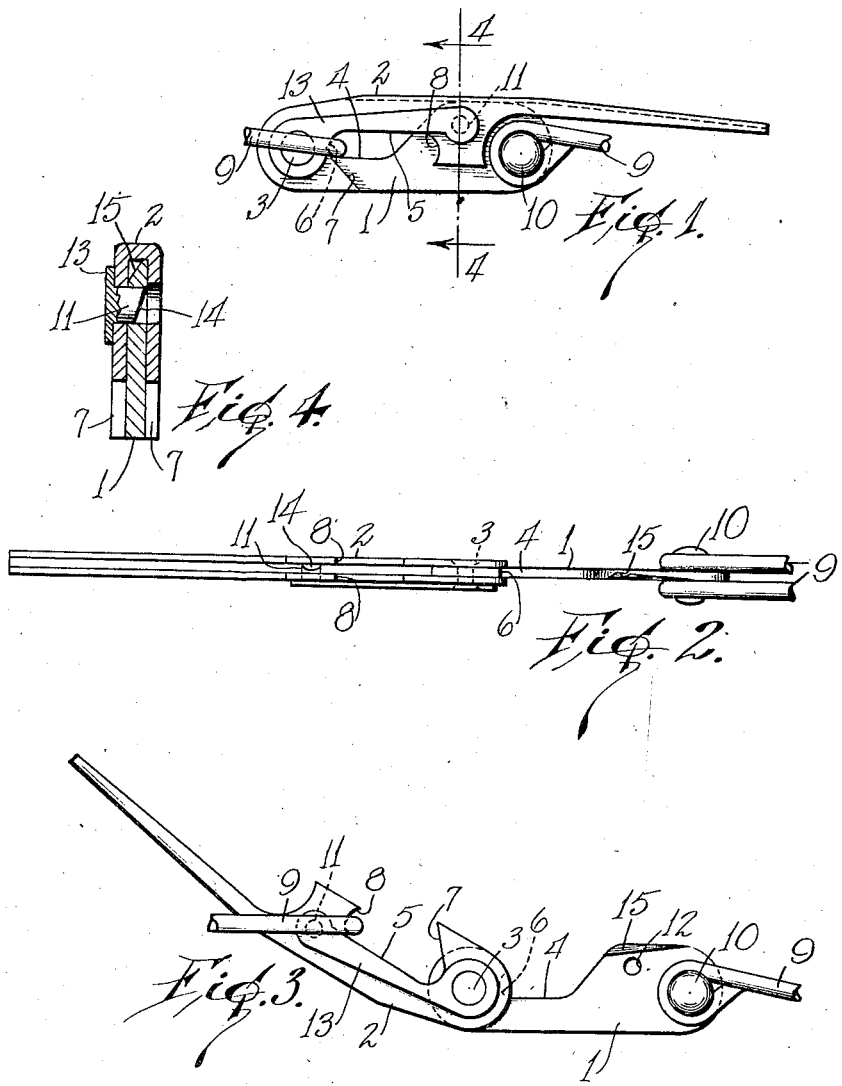
INVENTOR
L. Slama
BY
ATTORNEYS Patented July 17, 1923.

1,462,249

UNITED STATES PATENT OFFICE.

LEWIS SLAMA, OF HUMBOLDT, NEBRASKA.

TIRE-CHAIN TIGHTENER AND LOCK.

Application filed February 2, 1922. Serial No. 533,599.

*To all whom it may concern:*

Be it known that I, LEWIS SLAMA, a citizen of the United States, and a resident of Humboldt, in the county of Richardson and State of Nebraska, have invented a new and useful Improvement in Tire-Chain Tighteners and Locks, of which the following is a full, clear, and exact description.

My invention relates to improvements in chain tighteners, and it consists in the combinations, constructions, and arrangements herein described and claimed.

An object of my invention is to provide an improvement over that form of the device shown in my co-pending application, Serial No. 452,634, filed March 16, 1921. In said prior application, I disclosed a chain tightener and lock which comprises two members pivotally secured to each other and which are adapted to be locked in closed position by means of a cotter pin. The construction of the present device is primarily designed to obviate the disadvantage of loosing the cotter pin. To this end I provide a spring pressed pin which takes the place of the cotter pin and which securely locks together the two members of the device.

A further object of my invention is to provide a chain tightener and lock which consists of a minimum of parts and which is durable and efficient for the purpose intended.

Other objects and advantages will appear in the following specification, and the novel features of the invention will be particularly pointed out in the appended claims.

My invention is illustrated in the accompanying drawings, forming part of this application, in which—

Figure 1 is a side elevation of the device,

Figure 2 is a plan view of the device in opened position,

Figure 3 is a side elevation of the device in opened position, and

Figure 4 is a section along the line 4—4 of Figure 1.

In carrying out my invention, I provide a body portion 1 of the shape shown in Figure 3. A U-shaped arm 2 is pivotally secured to the body portion 1 at 3, and is adapted to be swung from the position shown in Figure 3 to the position shown in Figure 1. It will be observed from Figures 1 and 2 that the body portion 1 is provided with a recess 4, and that the arm 2 is provided with a recess 5. The side of the recess 4 disposed adjacent to the pin 3 is fashioned into a hook 6. In like manner, the side of the recess 5 disposed adjacent to the pin 3 is fashioned into a hook 7. The hook 6 and the hook 7 are adapted to be alined with each other when the arm 2 is swung into closed position with respect to the member 1. The opposite side of the recess 5 is also fashioned into a hook 8 over which the end of a tire chain 9 is adapted to be disposed. The other end of the tire chain 9 is secured to a rivet 10 which is carried by the member 1.

The means for locking the member 2 to the member 1 when the two members are swung into closed position, comprises a spring pressed pin 11 which is adapted to be received in the opening 12 of the member 1 (see Figures 3 and 4). The pin 11 is carried by a leaf spring 13, the leaf spring being disposed adjacent to one side of the arm 2 and being secured to the arm 2 by means of the pin 3. The leaf spring 13, when in normal position, causes the pin 11 to extend across the space between the two sides of the arm 2 so as to prevent the withdrawal of the member 1 from the space. The pin 11 has a beveled head 14 which is adapted to engage with the beveled portion 15 of the member 1 when the arm 2 is swung into closed position. The bevel 15 acts as a cam which forces the pin 11 against the tension of the spring 13 when the pin passes thereby. As soon as the pin 11 reaches the opening 12, however, the spring 13 will instantly cause the pin 11 to be projected into the opening 12. The two parts are now held in locked position and cannot be released from each other until a knife blade, or the like, is inserted between the arm 2 and the spring 13 so as raise the spring 13 a sufficient distance to release the pin 11 from the opening 12.

From the foregoing description of the various parts of the device, the operation thereof may be readily understood. The ordinary tire non-skid chain is composed of two long chains parallel with each other which are connected by transverse chains. To each non-skid chain I provide two of the locks. The ends of the parallel chains are secured to the rivet 10 of each lock, as heretofore described, and the free ends of the chains are disposed over the hooks 8 of the locks. It will now be apparent that when the arms 2 are swung from the position shown in Figure 3 to the position shown in Figure 1, the free ends of the chains 9 will be drawn into the hooks 6, thus tightening the chains about the tire. As heretofore stated, when the arm 2 is swung into closed position with respect to the member 1, the cam 15 will cause the pin 11 to move outwardly against the tension of the spring 13, and the pin 11 will engage with the opening 12 as soon as alined therewith. The non-skid chain is now securely held to the tire and is locked in position, since the pins 11 of the locks prevent the accidental opening of the locks. If the lock is desired to be opened, the spring 13 must first be flexed so as to release the pin 11 from the opening 12, whereby the arm 2 is free to swing.

From the foregoing it will be observed that I have provided a simple, durable, and efficient chain tightener and lock which is adapted to positively prevent a non-skid chain from being accidentally parted. The device may be readily secured to the ordinary non-skid tire chains without altering the construction of the latter. The device is not likely to easily get out of order and is thoroughly practical commercially.

I claim:

1. A device of the type described comprising a member having a hook portion, and having an opening therein, a U-shaped member pivotally secured to said first named member and being adapted to receive said first named member, said U-shaped member having a hook portion adapted to be alined with said first named hook, and a spring pressed pin carried by said U-shaped member and being adapted to enter the opening, said first named member having a beveled edge adapted to force said pin outwardly when said pin is moved thereby.

2. A device of the type described comprising a member having a hook-shaped recess therein, a U-shaped arm pivotally carried by said member, and having a recess adapted, with said first named recess, to provide a link receiving opening, a spring pressed pin carried by said U-shaped member and being adapted to engage with said first named member, said first named member having a beveled edge adapted to force said pin outwardly when the pin is moved thereby, and having an opening adapted to receive said pin.

3. A device of the type described comprising a member having a link receiving recess therein, a U-shaped member having a link receiving recess therein and being pivotally secured to said first named member, a leaf spring carried by said U-shaped member, and a locking pin carried by the free end of said spring and extending transversely across said U-shaped member, said first named member having an opening therein adapted to receive said pin when said members are swung into closed position.

LEWIS SLAMA.